Feb. 22, 1955   W. S. PENN ET AL   2,702,773
METHOD OF BONDING
Filed June 6, 1951
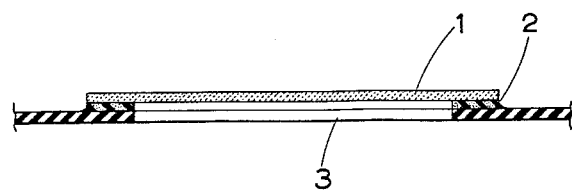
INVENTORS
WILLIAM S. PENN
ERNEST R. THORNLEY
ATTORNEY

United States Patent Office 2,702,773
Patented Feb. 22, 1955

2,702,773

METHOD OF BONDING

William Samuel Penn and Ernest Rayner Thornley, Dorking, England, assignors to Henley's Tyre & Rubber Company Limited, Dorking, England Application June 6, 1951, Serial No. 230,258

Claims priority, application Great Britain June 9, 1950

4 Claims. (Cl. 154—136)

In the manufacture of rubber articles such as the various types of respirators or helmets, in which an eyepiece or window of some transparent organic material forms an essential feature, mechanical methods of attaching the eyepiece or window to the body of the article have been hitherto used. Thus, methods such as sewing, riveting, or clinching have been commonly employed.

Direct bonding of the window or eyepiece to the main body of the article has not normally been practised, owing to the fact that the materials which have to be bonded together are highly incompatible, so that the commonly used elements and adhesives are not particularly effective. The direct bonding of a transparent organic material, of the kind commonly employed for such purposes, and rubber has, of course, many other applications, and it is an object of the invention to provide a method of obtaining such a bond. A further object is to provide bonded joints of these materials, and in particular to enable such a transparent organic material to be so bonded without spoiling its optical properties.

According to the invention a method of bonding together a rubber material and a transparent polymeric material having active hydrogen containing groups (i. e. groups containing hydrogen capable of being replaced chemically by sodium) comprises applying a polyisocyanate type compound between the two materials before the rubber is vulcanised and then applying heat and pressure to vulcanize the rubber and effect the bond.

The invention also includes a method of bonding together the rubber material and the transparent polymeric material wherein the rubber material is first bonded to an intermediate layer of a polymeric material of the same general class as that of the transparent polymeric material and then the main polymeric material is bonded to the intermediate layer by a cementing process or a heat welding process.

The term "rubber" is used in a generic sense and includes compounds or materials made from natural rubber, synthetic rubber, rubber substitutes and the like. The rubber structure to which the polymeric material is to be joined may take any suitably moulded form and may be reinforced with fabric if the requirements of the article so demand it.

The term "polymeric material having active hydrogen containing groups" includes cellulose derivatives in the class of organic cellulose esters (including mixed esters) or in the class of organic cellulose ethers. Examples of these latter materials are cellulose acetate, cellulose acetobutyrate and ethel cellulose. Further examples may be found in polyvinyl alcohol and its derivatives. The classes of material which have been mentioned within the general class of a "polymeric material having active hydrogen containing groups" are mentioned as examples only and we do not wish to preclude the possibility of other materials in this general class being used. The material may also contain other constituents, such as plasticisers.

The transparent member of polymeric material will, in general, take the form of a sheet or film of any desired shape, although we do not wish to preclude the possibility of applying the method to more elaborate constructions formed from the transparent material. In other words, the transparent member may be moulded or otherwise worked to any desired shape and construction.

The term "polyisocyanate type compound" is used to denote a polyisocyanate, polyisothiocyanate, or a mixed isocyanate-isothiocyanate. Typical chemicals in these groups include triphenylmethane triisocyanate; 1–6 hexane diisocyanate; 1-chloro phenylene-2-4-diisocyanate, and 1–5 naphthalene diisocyanate.

The invention further includes the bonded structures, either with or without the intermediate layer.

Any part of the polymeric material (transparent) member may be bonded or joined to any part of the rubber structure depending on the nature of the article to be manufactured. Normally, the joint or bond will be formed at the outer edges of the transparent member and the design or construction of the joint may take various forms. For example, the joint may structurally consist of a simple overlapping of the two materials or it may take a more elaborate form such as, for example, a "tongue and groove" joint.

Where the joint between the two materials is obtained by bonding them directly together, the polyisocyanate type compound is applied between the rubber and the transparent material before the rubber is moulded and vulcanised and the bond is formed during vulcanisation. The bonding material is preferably prepared in the form of a rubber cement containing the polyisocyanate type compound and in this case the rubber cement is normally applied to the surface of the transparent member or to both surfaces, if so desired. During the moulding and vulcanising process it is then necessary to contain the transparent member between suitably polished plates under pressure to avoid distortion.

In carrying out the above process it is necessary to observe care in many of the details of the process, otherwise unsatisfactory or inconsistent results will be obtained. The rubber cement employed as a vehicle for the polyisocyanate may be varied within fairly wide limits in that the compound let down in the solvent may have its composition varied according to the accepted principles of rubber compounding. The vulcanising characteristics of the cement compound should however be similar to those of the rubber compound from which the article itself is made. The solvent itself may also be varied over the range of normal rubber solvents. Similarly the concentration of the solute in the cement may be varied, although it should preferably be greater than 10%. The amount of polyisocyanate used in the cement can be varied between limits of 5% and 50% of the rubber hydrocarbon although the higher proportions are preferably used. The surfaces to be bonded should be well cleaned with a suitable rubber solvent. Any reasonable number of coats of the cement may be applied to give satisfactory results but we have found that the best results can be obtained by the application of two coats of the cement to give a total dry weight deposit of between 0.08 and 0.17 grams/sq. in. After the application of each coat of cement it is necessary to have a sufficient drying period varying between 10 minutes and 60 minutes. After the drying period the transparent member should be rolled securely down onto the cement.

The rubber article with the transparent member so cemented in position may now be moulded and vulcanised in a suitably designed mould, a feature of which is that it includes means for holding the transparent member between polished plates under pressure during the time the rubber is being moulded and vulcanised. The curing temperature may be varied over a wide range such as is normally used for the curing of rubber articles; a suitable temperature for example would be any between 270° F. and 310° F. The moulding pressure should be not less than 100 lbs. sq. in. and should preferably be considerably higher than this. A good bond between the transparent member and the rubber may be obtained during the cure normally applied to rubber articles of the kind under consideration. After curing, and before releasing the pressure on the mould, it is necessary to cool the mould to a temperature below that at which the material forming the transparent member normally commences to soften. All the examples of the conditions of carrying out the process are only given as general indications and do not preclude the use of any other conditions. A typical illustration of the process is given in Example 1.

Example 1

In the manufacture of a respirator, a suitably shaped, cellulose acetate window requires to be fitted and securely bonded to the main rubber body of the respirator. A rubber compound is first prepared, having the following composition:

| | |
|---|---:|
| Rubber (smoked sheet) | 100.00 |
| Mercapto benzothiazole | 0.50 |
| Zinc oxide | 5.00 |
| Stearic acid | 1.00 |
| Sulphur | 2.50 |
| P.33 carbon black | 10.00 |

This is made into cement by letting down 59.5 parts of the compound into 120 parts of petrol. Immediately before use the polyisocyanate is added to the extent of 25.00 parts on 179.50 of the cement. Vulcabond TX, a proprietary polyisocyanate compound, is employed. The edges of the unvulcanised rubber making contact with the cellulose acetate window are cleaned with petroleum solvent and this is followed by the appication of a thin coat of the cement. This is allowed to dry for 20 minutes and a further coat of the cement applied and again allowed to dry for 20 minutes, the two coats together giving a deposit of dry solid of 0.12 gram/sq. in. At the end of the drying period, the cellulose acetate window, after cleaning at its overlapping edges with petroleum solvent, is laid flat over the window aperture so that its edges overlap the cemented rubber surface. The assembly is then well rolled down, and placed in a cold mould. An essential feature of the mould is that it has means for holding the cellulose acetate window between polished plates under pressure during the time the rubber is being moulded and vulcanised. The closed mould is then placed in a hydraulic press at a temperature of 287° F. and under a pressure of 100 lbs./sq. in. After the curing time of 20 minutes the mould is cooled by circulating cold water through the platens of the press, before opening.

The direct process of bonding hereinbefore described is somewhat critical owing to the need to prevent distortion of the transparent member at the high temperatures used for vulcanising the rubber, and this is particularly the case where the article has an intricate design. To avoid this difficulty, an alternative method has been developed, which consists in forming the joint between the rubber structure and the transparent member by first bonding to the rubber an intermediate material which will consist of or contain a polymer of the same general class as that used for the main transparent member, and afterwards bonding the main transparent member to the intermediate material by a cementing process or a heat welding process using generally known techniques for bonding such materials to each other. The intermediate material may consist of a sheet or film of the same material used for the main transparent member or it may be a sheet or film of some similar polymeric material which may be easily attached to the main member by partially softening with a solvent or heat welding, or it may be a fabric woven from filaments made of similar polymeric materials or from such filaments mixed with other filaments such as cotton. The intermediate material may, if necessary, take other forms such as, for example, a suitably moulded form for keying into the rubber structure. The intermediate material is bonded to the rubber by a similar method to that described for the direct bonding of the main transparent member to the rubber and the same general precautions are to be observed. Various methods of joining a polymeric material of the kind used for the transparent member to itself or to a similar material are generally known, the two main methods being (1) a cementing method [1] in which a cement is used consisting of the polymeric material dissolved in a suitable solvent and (2) a heat welding method [2] where either a normal source of heat is used or alternatively high frequency heating. Either of these recognized techniques may be used for bonding the transparent window to the intermediate material previously bonded to the rubber; in practice the preferred method is the cementing method as described below in Example 2.

[1] For example, see "Cellulose Acetate Plastics" (particularly Chapter 8), Vivian Stannett, Temple Press Ltd., London, 1950.

[2] See "Welding of Plastics," G. Haim and H. P. Zade, Crosby Lockwood & Son Ltd., London, 1947.

Example 2

In the manufacture of a respirator similar to that referred to in Example 1, an intermediate strip of cellulose acetate film, 0.010" thick, is bonded round the window aperture, the strip being of sufficient width to enable the overlapping edge of the window to be subsequently bonded to it. The intermediate strip is bonded to the rubber by the same method as that described in Example 1. A cellulose acetate window is then attached round its edges to the intermediate strip, previously bonded to the rubber, by the use of a cellulose acetate cement consisting of a 20% solution of cellulose acetate in a solvent consisting of a 60:40 mixture of acetone and ethyl lactate, which has been allowed to "ripen" for a minimum period of seven days before use. The surface of the intermediate strip, before the application of the cement, is well cleaned with acetone, the same applying to those parts of the window of cellulose acetate which will overlap onto the intermediate strip. An applicator is then employed to apply a thin coat of cement around the intermediate strip and this is allowed to dry for 5 minutes. The cellulose acetate window is then pressed flat over the aperture and onto the intermediate strip so that the cement is squeezed between the overlapping edges of the cellulose acetate window and the intermediate strip. The assembly is placed in a cold press under a pressure of 500 lbs./sq. in. for 5 minutes. After removal from the press the joint is allowed to stand for 24 hours, when it will be found that a satisfactory bond has been achieved.

In the case of certain of the materials which might be used as the intermediate material it may be necessary, in order to effect the final welding of the main transparent member, to treat the intermediate material either before or after it has been bonded to the rubber with some suitable plasticiser. For example, this would apply if there were used for the intermediate material a fabric manufactured from woven filaments of cellulose acetate, and a suitable plasticiser to use in such a case would be dimethyl phthalate.

The accompanying diagrammatic drawing is a vertical section through part of a respirator which may be manufactured according to Example 1. This laminated article comprises a component 1, constituted by a transparent sheet material from the group consisting of cellulose ethers and esters, a bonding medium 2 comprising a rubber cement containing a compound from the group consisting of polyisocyanates, polyisothiocyanates, and mixed isocyanate-isothiocyanates, and a component 3 formed of rubber constituting part of the body of the respirator. It will be seen that the component 3 is formed with an aperture, the edge of which is overlapped by the edge of transparent material, the bonding medium being interposed between the overlapping edges. The components 1 and 3 as well as the bonding medium 2, are consolidated by vulcanization.

We claim:

1. A method of bonding together a rubber material and a transparent sheet material from the group consisting of cellulose ethers and esters, which comprises applying a rubber cement including a compound from the group consisting of polyisocyanates, polyisothiocyanates, and mixed isocyanate-isothiocyanates between the two materials before the rubber material is vulcanized, placing the two materials in a mould, subjecting the transparent sheet material to pressure of a high degree of uniformity over the surface of said transparent sheet material thus holding it against distortion, and subjecting the two materials, while in said mould, to heat to vulcanize the rubber and effect the bond.

2. A method of bonding as claimed in claim 1, wherein the polyisocyanate type compound is a polyisothiocyanate.

3. A method of bonding together a rubber material, and a transparent sheet material from the group consisting of cellulose ethers and esters, which comprises applying a rubber cement including a compound from the group consisting of polyisocyanates, polyisothiocyanates, and mixed isocyanate-isothiocyanates between the two materials before the rubber material is vulcanized, placing the two materials in a mould, subjecting the transparent sheet material to pressure of a high degree of uniformity over the surface of said transparent sheet material thus holding it against distortion, and subjecting the two materials, while in said mould, to heat to vulcanize the rubber, and cooling said mould to a temperature below that at which said transparent sheet material normally softens, to effect the bond.

4. A laminated article comprising a first component formed of rubber, a second component formed of a transparent sheet material from the group consisting of cellulose ethers and esters, and a bonding medium comprising a rubber cement including a compound from the group consisting of polyisocyanates, polyisothiocyanates, and mixed isocyanate-isothiocyanates located between said first and second components and in intimate contact therewith, said first and second components and bonding medium being consolidated by vulcanization.

References Cited in the file of this patent

UNITED STATES PATENTS

| Number | Name | Date |
|---|---|---|
| 1,815,444 | Moss | July 21, 1931 |
| 2,079,641 | Walsh et al. | May 11, 1937 |
| 2,336,273 | Malm | Dec. 7, 1943 |
| 2,415,839 | Neal et al. | Feb. 18, 1947 |
| 2,430,479 | Pratt et al. | Nov. 11, 1947 |
| 2,439,369 | Nicol | Apr. 6, 1948 |
| 2,468,629 | Herzig et al. | Apr. 26, 1949 |